Figure 1:
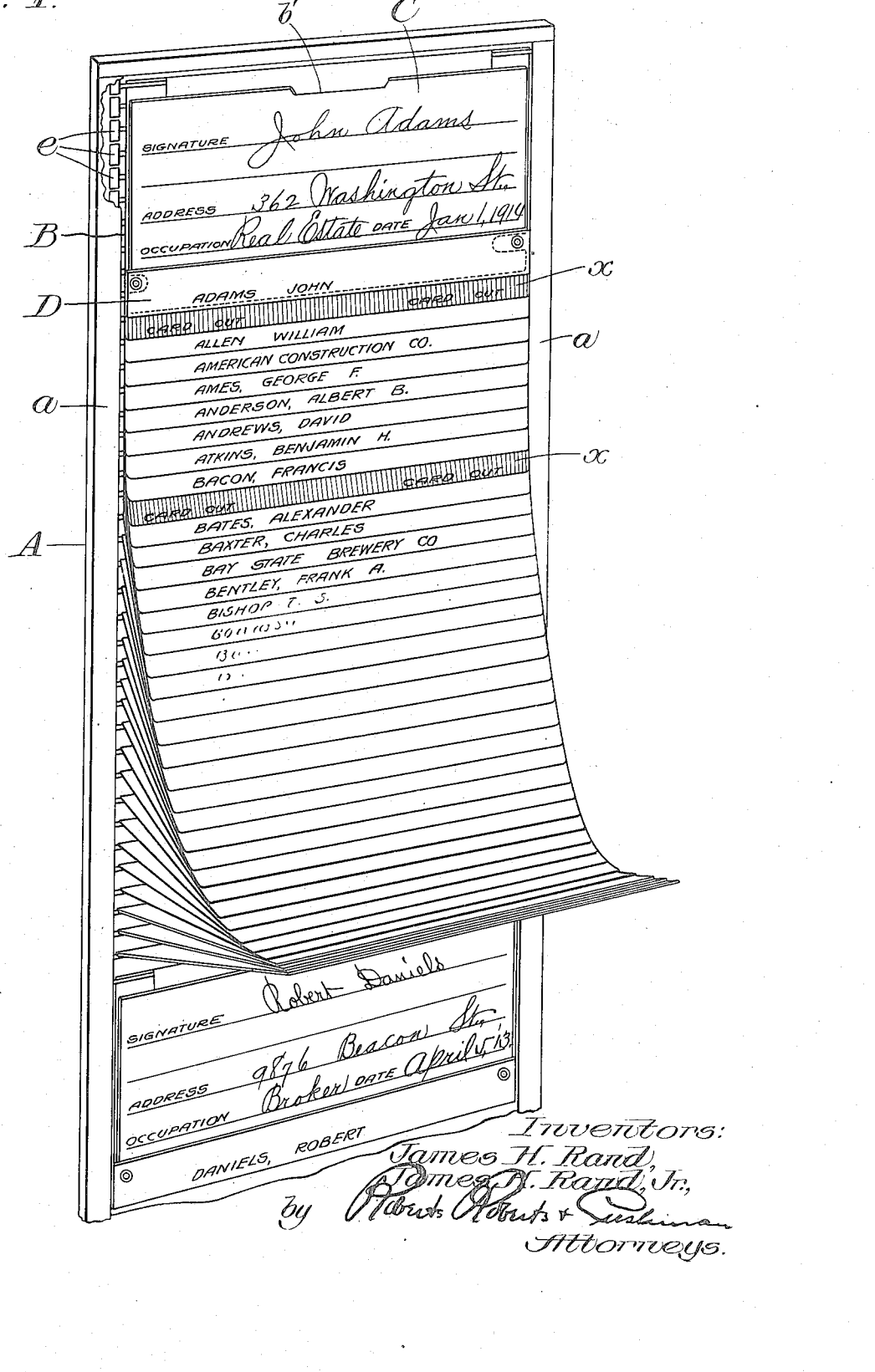

J. H. RAND & J. H. RAND, Jr.
CARD SYSTEM.
APPLICATION FILED SEPT. 7, 1915.

1,194,422.

Patented Aug. 15, 1916.
3 SHEETS—SHEET 1.

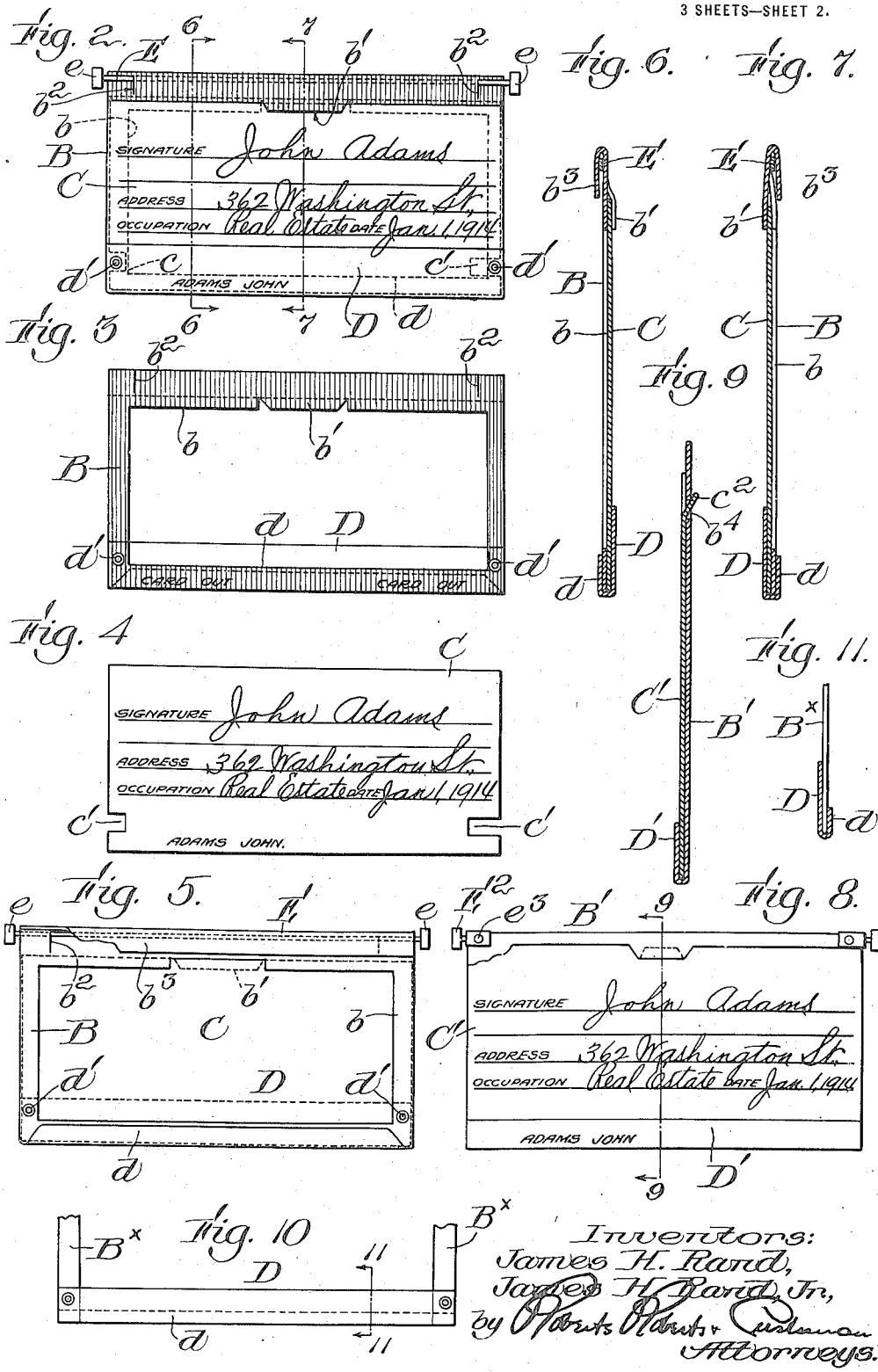

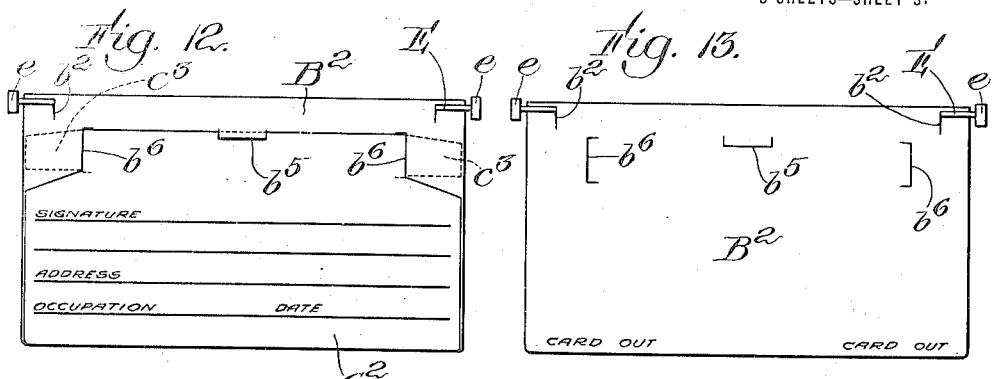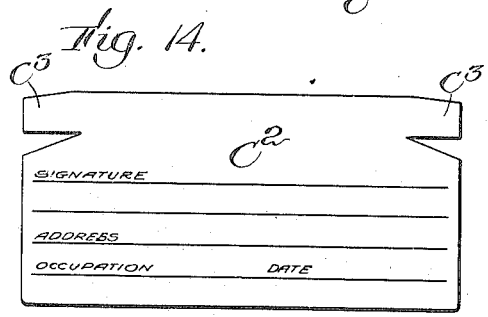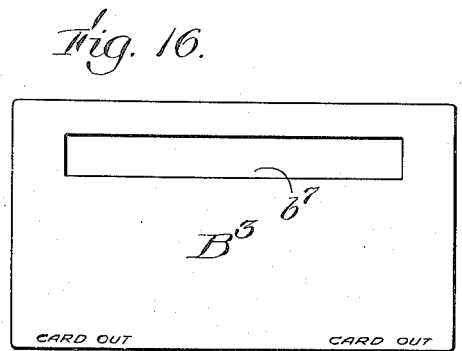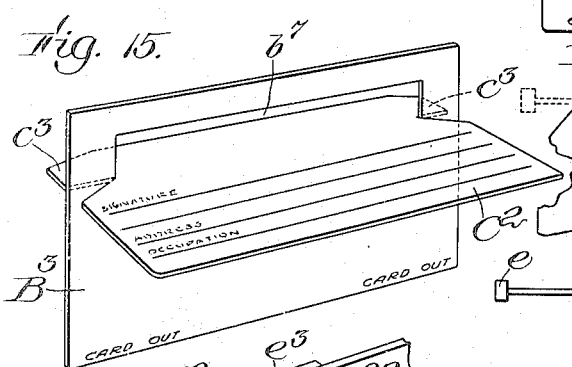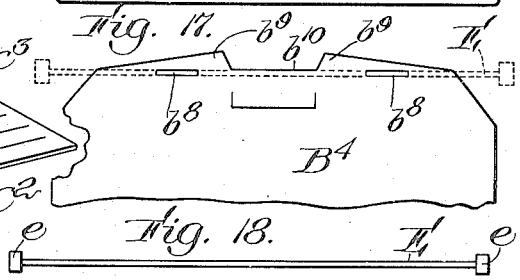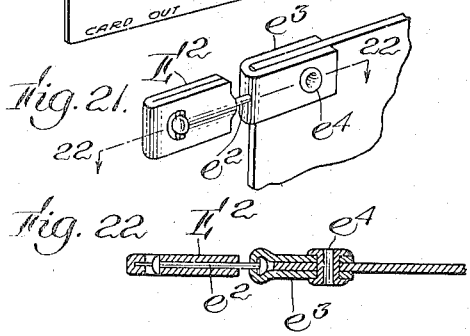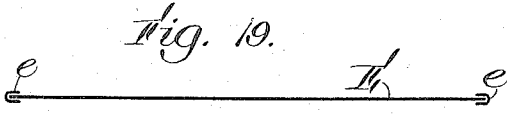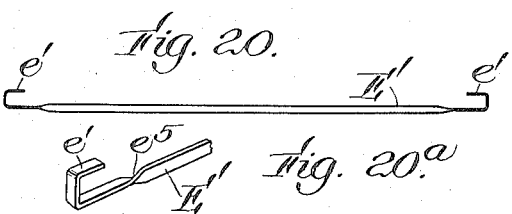

UNITED STATES PATENT OFFICE.

JAMES H. RAND AND JAMES H. RAND, JR., OF NORTH TONAWANDA, NEW YORK.

CARD SYSTEM.

1,194,422.      Specification of Letters Patent.      Patented Aug. 15, 1916.

Original application filed April 8, 1914, Serial No. 830,508. Divided and this application filed September 7, 1915. Serial No. 49,139.

*To all whom it may concern:*

Be it known that we, JAMES H. RAND and JAMES H. RAND, Jr., citizens of the United States, and residents of North Tonawanda, in the county of Niagara and State of New York, have invented new and useful Improvements in Card Systems, of which the following is a specification.

This invention relates to card index systems, and the present application is a division of application Serial Number 830,508, filed by us April 8, 1914.

The chief object of the invention is to provide a novel card index system so constructed, organized and arranged, that if any card is missing from the file its absence will be visually indicated. To this end we provide a series of card-holders or card-supports mounted in a suitable frame, and preferably adjustable and interchangeable in the frame and removable therefrom, and a series of cards removably held by the card holders, and detachable therefrom without removing their card-holders from the frame. The system is of the overlapping card type, wherein the cards are held one in front of another or one above another, with their edges or margins exposed. Thus when a card is removed from the system, its card holder is left in the frame, its space is reserved, and its absence from its proper place is visually indicated by the absence of its edge or margin from the proper place in the series of exposed card edges or margins. In overlapping card systems of this sort as heretofore made a card cannot be removed from its series without also removing from the frame its support and spacer, to which it is attached either permanently or otherwise in such manner that the card cannot be taken off at all, or cannot be taken off while the card support and spacer are mounted in the frame. The result is that when such a card with its holder and spacer, is removed, its space is not reserved but the other card-holders are free to close together and there is nothing to indicate that a card is missing, nor to guide the user to the precise point in the series to which the card should be restored.

In our invention the exposed margins or edges of the cards when in normal position preferably each cover and conceal a signal, which is uncovered when the card is removed from the series and so conspicuously indicates that fact. Such signals may be placed upon the edges or margin of the card-holders, for which purpose the card-holders may be made of suitable sheet material extending substantially to the exposed edges of the overlying cards and bearing some mark visually distinguishable from the cards, such as color, inscription, or other distinctive characteristic, which indicates when uncovered that the card is removed from its holder.

The invention further relates to the novel card-holders, cards and other features hereinafter described and particularly pointed out in the claims.

Throughout the specification and claims we have used the word "card" not in the limited sense of a comparatively thick sheet of paper or pasteboard, but to indicate generally any sheet of any desired weight and any suitable material; and it is one of the advantages of the invention that certain of the forms of our card-holders make it possible to use cards (sheets) of thin paper, or other material of a texture which would not be practicable without the support of such card-holders.

In the accompanying drawings which illustrate certain embodiments of the invention,—Figure 1 is a perspective view of one form of the invention with the parts assembled; Fig. 2 is a front view of one of the card-holders and cards shown in Fig. 1; Fig. 3 is a front view of said card-holder with the card removed; Fig. 4 is a face view of said card; Fig. 5 is a rear view of said card-holder with the card in place; Fig. 6 is a section on line 6—6 of Fig. 2; Fig. 7 is a section on line 7—7 of Fig. 2; Fig. 8 is a front view of another form of card-holder and card; Fig. 9 is a section on line 9—9 of Fig. 8; Fig. 10 is a partial front view of another form of card-holder; Fig. 11 is a section on line 11—11 of Fig. 10; Fig. 12 is a front view of another form of card-holder and card; Fig. 13 is a front view of the card-holder shown in Fig. 12 with the card removed; Fig. 14 is a front view of the card shown in Fig. 12; Fig. 15 is a perspective view of still another form of card-holder and card; Fig. 16 is a front view of the card-holder shown in Fig. 15; Fig. 17 is a partial front view of still another form of card-holder; Fig. 18 is a front view of the one form of spring supporting bar on which said card-holders are hinged; Fig. 19 is a top view of said supporting bar; Fig. 20 is a front view of another form of the supporting bar; and Fig. 20ª is a perspective view of one end of the same; Fig. 21 is an enlarged perspective view of another form of support on which the card-holders may be hinged; and Fig. 22 is a section on line 22—22 of Fig. 20.

Referring first to that form of the invention illustrated in Figs. 1 to 7 inclusive: A represents a frame or panel, preferably made of sheet metal, and having inwardly extending flanges $a$, $a$, at its opposite edges, forming channels to receive the ends of the supports, hereinafter described, to which the card-holders are hinged. Said cardholders consist each of a rectangular sheet of cardboard or paper B, upon which is removably held a card C. It has already been noted that the word "card," as used throughout the specification and claims, indicates the removable sheet supported by the cardholder whether said sheet is a stiff card or a thin and very flexible piece of paper or other material. Indeed, it is one of the features of the invention that it makes possible the use of thin material, too light and flexible for ordinary card systems, for receiving the indexed matter or other inscriptions, thus reducing the expense of maintaining a constantly growing and changing card system, and enabling the cards to be printed by an ordinary typewriting machine without the use of special attachments which are required for holding stiff cards. The card-holder B is cut out as shown at $b$ to form an opening or window through which the rear of the card C is exposed to view, and both sides of the card may be used for inscriptions and may be inspected without removing the card. At the lower end of the card-holder is a sheath or pocket of sheet celluloid or other suitable transparent material D, folded over the lower edge of the body of the cardholder as shown at $d$ to form a trough for engaging the edge of the card; said sheath is secured to the body of the card-holder B by eyelets $d'$, $d'$, or other suitable fastening devices. A tongue $b'$ is cut from the cardholder body B opposite the sheath D, and the card C is sprung into place by bending it a little, its lower edge being held between the sheath D and the card-holder body, and its upper edge being held behind the tongue $b'$. In order that the card may extend substantially the full width of the card-holder, it is provided with notches $c$ and $c'$, to receive the eyelets $d'$, $d'$, one of said notches, $c'$, being a little deeper than the other, to permit the card, while being applied to or removed from the card-holder, to be shifted laterally far enough to enable the opposite end to pass the eyelet $d'$. Thus the card overlies and substantially conceals the cardholder and is locked against accidental movement edgewise in every direction by the sheath or pocket D, the tongue $b'$, and the eyelet fasteners $d'$, $d'$. The card would also be supported and locked in place, even without the trough formed by the fold $d$ of the celluloid sheet, on account of the notches $c$, $c'$, and the eyelets $d'$; and the sheath D might be simply an unfolded flat strip secured to the front side of the cardholder to protect the margin of the card. It will also be seen that the tongue $b'$ might be omitted, and satisfactory results still obtained if the pocket D were made deep enough to afford sufficient support for the card to prevent it from tilting forward too much,—especially as the top edge of the card would receive support from the next overlapping card when the parts are assembled as shown in Fig. 1. Each card-holder B is hinged to a supporting bar, which consists of a strip of spring steel E or other suitable resilient material, the bar E may be inserted through slots $b^2$ in the cardholder B, or the margin of the card-holder B may be folded over the bar E as shown at $b^3$, or both, as shown in the drawings. The card-holder is thus removably suspended from the bar E and can be replaced by another in case it should become damaged or worn. A lug $e$ is secured to each end of the bar E and projects beyond the lateral edges of the card-holder. Said lugs $e$ are flat and of suitable width in a vertical direction to constitute spacers for the several card-holders when the parts are assembled with the lugs $e$ in the channels formed by the flanges $a$ on the frame A. The bar E is preferably made of flat, thin and relatively deep spring metal so that it will bend easily in a plane transverse to the frame A, but will be comparatively inflexible in a plane parallel to the frame. The bars, may, therefore, be easily sprung to insert the lugs $e$ under the flanges $a$ or remove them therefrom, but will afford a relatively stiff support for the card-holders. In place of the bar E and spacing lugs $e$, a metal rod E' (Figs. 20 and 20ª) might be used, with its ends bent to form spacers $e'$ which fit under the flanges $a$ of the frame, in a manner similar to the lugs $e$. The wire or metal strip of which rod E' is made is preferably flat in cross section so that adjacent spacers $e'$ will have good abutting surfaces; and in order that the body of the rod E' may stand flatwise with relation to the card-holders and to the frame A, a quarter turn or twist $e^5$ is put into the strip near each end.

Another modification of the supporting device to which the card-holders may be hinged is shown in Figs. 21 and 22. In this form the supporting lug and spacer E² consists of a piece of sheet metal folded upon itself, and swiveled to turn on a headed stem $e^2$ extending horizontally from a clip $e^3$ of folded metal which is secured to one of the upper corners of the card-holder by means of eyelets $e^4$. With any of said forms the card-holder may be swung on its hinge when the lugs or spacers are held under the flanges $a$.

Referring to the modification of card-holder and card shown in Figs. 8 and 9, the card-holder B′ is made wholly of sheet celluloid, or other suitable transparent material, so as to expose the card to view on its rear side, with its lower edge turned up to form a card receiving pocket D′. The card C′ is made with a tongue $c^2$ on its upper edge, which projects through a slot $b^4$ in the card-holder B′, and locks the card in position. The card-holder B′ is shown as provided with swiveled lugs $E^2$ of the kind illustrated in Figs. 21 and 22.

The modification of the card-holder shown in Figs. 10 and 11 is similar to the form shown in Figs. 2 and 3 except that the sheet from which the card-holder B× is formed, is cut entirely away at the bottom, leaving only the two side strips which are connected across the bottom by the celluloid trough composed of the transparent sheath D and the upturned lip $d$.

In Figs. 12, 13 and 14, the card-holder $B^2$ is cut to form a tongue $b^5$ and two slots $b^6$. The card $C^2$ is formed with two laterally extending wings $c^3$ which slip through slots $b^6$, while the tongue $b^5$ engages the top edge of the card and locks it in position. The card-holder $B^2$ is not cut away to expose the rear of the card, though that would be possible. The supporting bar E to which the card is hinged is the same as already described.

In Figs. 15 and 16, a card-holder is shown, suitable for supporting a card $C^2$ of the same construction as shown in Figs. 12 and 14. This card-holder $B^3$ is cut out to form the long and narrow aperture $b^7$, through which the wings $c^3$ of the card pass to support the card on the card-holder. If it is desired to inspect or write upon the rear of the card $C^2$, it may be swung upward on the lower edge of aperture $b^7$ as a pivot, in the manner shown in Fig. 15. Thus both sides of the card may be inspected without removing the card, though there is no window through the card-holder.

In the modification shown in Fig. 17 the card-holder $B^4$ is provided with lengthwise or horizontally extending slots $b^8$, and the spring supporting bar E is inserted through said slots. The two ears $b^9$, $b^9$, forming a thumb cut $b^{10}$ between them, may be left as shown in Fig. 17, or folded over the bar E in a manner similar to the lip $b^3$ of the other forms.

When the index system is assembled as shown in Fig. 1 with the series of card-holders supporting the series of cards one in front of another, the margin of each card, containing the name or other indexed matter identifying that card will be exposed below the next overlying card-holder and card. The breadth of such exposed margin will be determined by the breadth of the lugs or spacers $e$. All of the exposed margins will be incased in and protected by the transparent celluloid sheath D, and the several cards will substantially cover and conceal the card-holders. To inspect any card the next overlying card and card-holder may be swung upward on its hinge, as illustrated in Fig. 1 of the drawings, carrying with it a number of superposed cards. If, now, any card is removed from its card-holder for any reason, the absence of that card will be visually indicated by the absence of its edge or margin. Thus, if any card is missing from its place in the system either for a legitimate purpose, or through negligence, or through mischief, its very absence constitutes a signal of that fact, whereas in ordinary card systems the loss or absence of a card would in no wise be apparent by looking at the system as a whole. As visual aids to indicating the absence of the cards, we prefer to make the card-holders of a different color from the cards themselves, so that when a card is removed and exposes the edge of its card-holder the contrasting color of the latter will constitute a signal indicating the absence of the card. An additional signal is preferably provided consisting of words indicating the absence of the card such as "card out" printed on the margin of the card-holder. In Fig. 1 the margins of the exposed card-holders $x$, $x$, thus visually distinguished, constitute signals indicating two missing cards.

It will be understood that the invention is not limited to downwardly hanging cards and card-holders with the hinged connections near their upper edges, but includes as well card-holders of the upstanding type, supported in the frame at their lower edges, and also includes other forms of frames and receptacles, and other forms of card-holders, so long as the same respond to the characteristics pointed out in the claims.

We claim:

1. A card system, comprising a series of card-holders, and a series of cards removably held by said card-holders, said card-holders being adapted to support said cards one in front of another with their edges exposed, whereby the absence of any card from its card-holder will be visually indicated by the absence of its edge from the series of exposed card edges.

2. A card system, comprising a series of card-holders, and a series of cards removably held by said card-holders, said cardholders being adapted to support said cards one in front of another with their edges exposed, and a signal normally concealed behind the exposed edge of each card, whereby the removal of any card from its card-holder will expose its underlying signal and visually indicate the absence of such removed card.

3. A card system, comprising a series of card-holders, and a series of cards removably held by said card-holders, said card-holders being adapted to support said cards one in front of another with their edges exposed, and the edges of the card-holders extending substantially to the exposed edges of the cards overlying and supported by them respectively, whereby the absence of any card from its card-holder will be visually indicated by exposing the edge of such card-holder.

4. A card system, comprising a series of card-holders, and a series of cards removably held by said card-holders, said card-holders being adapted to support said cards one in front of another with their edges exposed, and the edges of the card-holders extending substantially to the exposed edges of the cards overlying and supported by them respectively, the exposed edges of the cards and of the card-holders being visually distinguishable from each other.

5. A card system, comprising a series of card-holders, and a series of cards removably held by said card-holders, said card-holders being adapted to support said cards one in front of another with their margins exposed to view, and a sheath of transparent material on each card-holder covering the exposed margins of the cards.

6. A card index system, comprising a supporting frame, a series of overlapping card-holders severally hinged to said supporting frame, the margin of each card-holder projecting beyond the edge of the next superposed card-holder, and a series of cards removably held by said card-holders with their several margins exposed and covering said projecting margins of the card-holders, whereby the absence of any card from its card-holder will be visually indicated by the absence of its margin from the series of exposed card margins.

7. A card-holder for card index systems, having a sheath of transparent material extending along one margin thereof, and a card removably mounted on said card-holder with one margin covered by said sheath.

8. A card-holder for card index system, having a sheath of transparent material secured thereto at one edge and folded over the body of the card-holder to form a pocket and trough, and a card removably mounted on said card-holder with one margin in said pocket and trough.

9. A card-holder for card index systems, comprising a sheet, a sheath of transparent material secured to said sheet by means of fasteners at each end, and a card removably mounted on said card-holder with one margin covered by said sheath, said card being provided with notches in its edges to receive said fasteners.

10. In a card system, a frame having inwardly facing guide channels, a card-holder removably supported in said frame, having means engaging and retained by said guide flanges, and a card removably held by said card-holder and adapted to be removed therefrom without removing the card-holder from the frame.

11. A card system, comprising a frame having inwardly facing guide channels, a series of card-holders supported one above another in said frame, having means engaging and retained by said guide flanges, and a series of cards removably held by said card-holders, said cards being removable from their respective card-holders without removing the card-holders from the frame.

12. A card-holder for card-index systems, comprising a body of sheet material, a sheath of transparent material extending along one margin thereof, a card removably mounted on said card-holder with one margin covered by said sheath, and card locking means spaced from the sheath and coöperating therewith to hold the card against accidental dislodgment from its holder.

13. A card-holder for card-index systems, comprising a body of sheet material having a card locking means cut therefrom, a sheath of transparent material extending along one margin thereof, and a card removably mounted on said card-holder with one margin covered by said sheath, said card locking means being adapted to engage an edge of the card which projects clear of the sheath.

Signed by us, the said JAMES H. RAND and the said JAMES H. RAND, JR., at North Tonawanda, N. Y., this 2nd day of September, 1915.

JAMES H. RAND.
JAMES H. RAND, JR.